United States Patent [19]

Fujiwara

[11] Patent Number: 4,921,215
[45] Date of Patent: May 1, 1990

[54] REDUCING VALVE ASSEMBLY WITH SPHERICALLY SHAPED OPERATING PART

[75] Inventor: Katsuji Fujiwara, Hyogo, Japan
[73] Assignee: TLV Co., Ltd.
[21] Appl. No.: 251,187
[22] Filed: Sep. 29, 1988

Related U.S. Application Data

[63] Continuation-in-part of Ser. No. 917,401, Oct. 10, 1986, abandoned.

[51] Int. Cl.⁵ .......................................... F16K 31/122
[52] U.S. Cl. .................................. 251/63.4; 251/63.5; 137/193
[58] Field of Search ................. 251/63, 62, 63.5, 63.4; 137/505.42, 505.41, 192

[56] References Cited

U.S. PATENT DOCUMENTS

| | | |
|---|---|---|
| 1,950,728 | 3/1934 | Heaney . |
| 2,155,170 | 4/1939 | Odend'hal . |
| 2,963,040 | 12/1960 | Zinnier ...................... 137/505.42 X |
| 3,262,464 | 7/1966 | Frantz ........................... 251/63 UX |
| 3,291,153 | 12/1966 | Lyon .............................. 137/624.14 |
| 3,358,964 | 12/1977 | Cohen ................................ 251/324 |
| 3,701,599 | 10/1972 | Stewart . |

FOREIGN PATENT DOCUMENTS

14633 9/1881 Fed. Rep. of Germany .
622913 12/1935 Fed. Rep. of Germany .

Primary Examiner—Alan Cohan
Attorney, Agent, or Firm—Toren, McGeady & Associates

[57] ABSTRACT

In a reducing valve assembly having a fluid inlet port and a fluid outlet port with a main valve for controlling flow between the inlet and outlet port, the main valve includes a main valve member which is actuated by an operating piston including a piston rod. In order to improve the flow characteristics of the assembly, a movable wall of the piston which transmits displacement through the piston rod to the valve member is connected with the piston rod by shaping the wall extending therebetween with a spherically curved configuration outwardly in a diametral direction from the piston rod.

6 Claims, 4 Drawing Sheets

REDUCING VALVE ASSEMBLY WITH SPHERICALLY SHAPED OPERATING PART

CROSS REFERENCE TO RELATED APPLICATION

This is a continuation-in-part of application Ser. No. 917,401 filed Oct. 10, 1986 now abandoned.

FIELD AND BACKGROUND OF THE INVENTION

The present invention relates generally to reducing pressure valves or to an automatic regulating valve which reduces pressure on a primary side to a predetermined pressure on a secondary side by changing the opening of a valve through the energy of the fluid itself which passes therethrough.

Reducing valves generally include two types. One is a direct-acting type wherein a secondary pressure detecting section itself becomes an operating section which directly actuates a valve member. The second is a pilot-operated type wherein, using a direct-acting reducing valve as a pilot section, the main valve member is operated by regiulating the pressure in a main valve operating section. The present invention involves the construction of a connecting section between a valve member and the operating section of such valves and is applicable to both direct-acting reducing valves and pilot-operated reducing valves.

The invention relates generally to improvements in the offset characteristics and rated flow characteristics of the reducing valve.

In the art to which the present invention relates, the following terms shall have the following meanings (source: Heating, Air-Conditioning and Sanitary Standard HASS 106-1978):

Minimum regulatable flow rate:
  Minimum flow rate of the reducing valve at which a steady state of flow can be maintained.
Set Pressure:
  A pressure on the secondary side at the minimum regulatable flow rate.
Offset:
  The difference between the set presure and the pressure on the secondary side which varies as the flow rate is gradually increased from the minimum regulatable flow rate to the rated flow rate of the reducing valve with the pressure on the primary side held constant.
Rated flow rate:
  Maximum flow rate that can be assured within a specific offset when the pressure on the primary side is held fixed.

In the context discussed above, a good reducing valve is one which has low offset and a high rated flow rate.

It has been found that in valves in accordance with the prior art, the flow rate characteristics show a relatively large offset and a relatively small rated flow rate. Limitations on the flow rate characteristics are presumed to arise due to certain structural characteristics of prior art valves, and, accordingly, the present invention is directed toward improving the flow rate characteristics of prior art reducing valves by providing an improved structural configuration for the related parts thereof.

U.S. Pat. No. 3,262,464 to Frantz shows a drain valve having a movable valve member which has small and large diameter guidance portions that slide in respective cylinders to firmly support the valve member against jamming. A curved annular surface is provided on the valve member in Frantz for engaging a valve seat. No particular dimensional relationship is provided between the curved portion and the guiding portions of the valve member in Frantz and no indication is given that the curved surface would aid in avoiding jamming or rattling when the valve is closing.

U.S. Pat. No. 3,291,153 to Chabrier et al. shows the use of spherical valve members in a fluid actuated oscillator.

SUMMARY OF THE INVENTION

Briefly, the present invention is directed toward an improvement in a reducing valve assembly including a fluid inlet port and a fluid outlet port with a main valve for controlling flow therebetween. The main valve includes a main valve member actuated by an operating part consisting of a piston. The piston includes an operating rod consisting of a piston rod and the piston rod transmits movement of the piston to the main valve member. In accordance with the invention, an improvement is provided comprising that a movable wall of said operating part or piston and said operating rod which transmits displacement of said movable wall to said main valve member are connected by a wall having a spherically curved configuration expanding outwardly in a diametral direction from said operating rod. In accordance with a first aspect of the invention, the movable wall may be formed as a hemisphere. Alternatively, the movable wall may be formed in the shape of a three-quarter sphere or it may be formed as a hemisphere with a contiguous cylindrical portion. In further aspects of the invention, the movable wall is formed as a fluted hemispherical configuration consisting of a plurality of contiguous panels.

The various features of novelty which characterize the invention are pointed out with particularity in the claims annexed to and forming a part of this disclosure. For a better understanding of the invention, its operating advantages and specific objectives attained by its use, reference should be hand to the drawings and descriptive matter in which there are illustrated and described the preferred embodiments of the invention.

DETAILED DESCRIPTION OF THE PREFERRED EMBODIMENTS

Figure 9:
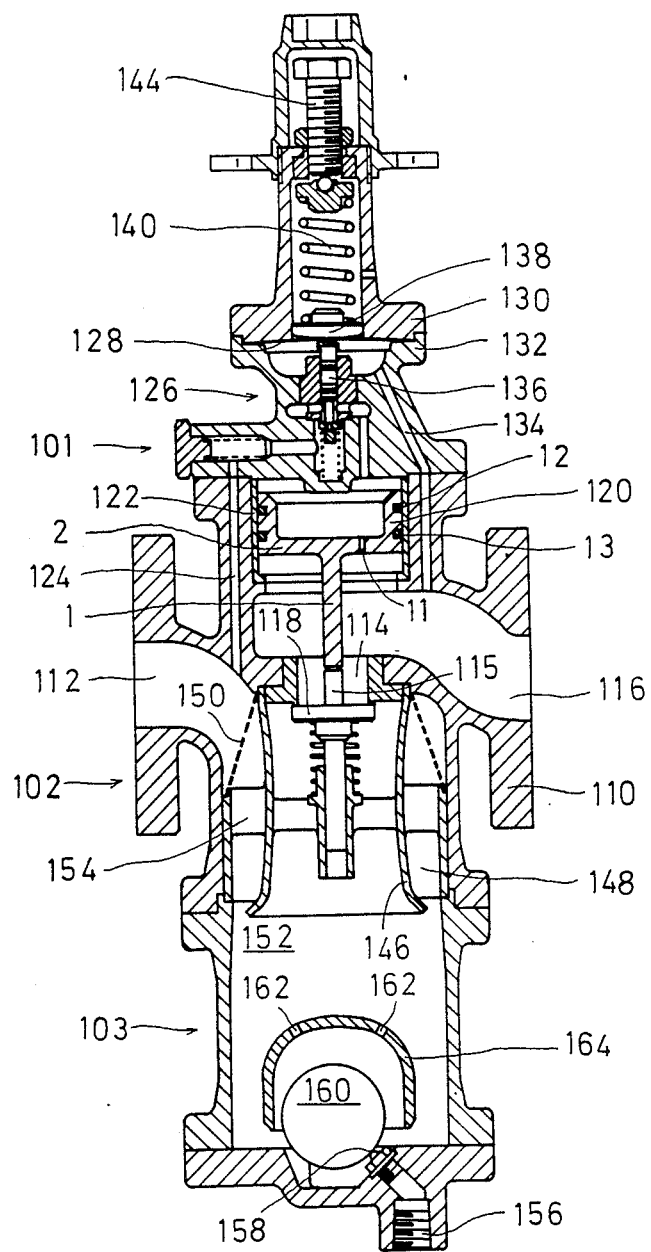
FIG. 9 is a sectional view of a reducing valve in accordance with the prior art of the type wherein the present invention is utilized.

In order to provide a background for a better understanding of the present invention, reference is made first to FIG. 9, wherein there is disclosed a reducing valve assembly in accordance with the prior art, wherein the present invention may be utilized. In prior art systems of the type disclosed in FIG. 9, a pilot operated reducing valve is formed as comprising a reducing valve section 101, a steam separator section 102 and a drainage valve section 103.

An inlet port 112 and an outlet port 116 are formed in a valve casing 110. Between the inlet port and outlet port, there is defined a valve port 114 through which the inlet port and the outlet port may be placed in flow communication. The valve port 114 is opened and closed by a main valve member 118 which, together with the valve port 114, constitutes a main valve for the valve assembly of FIG. 9.

The inlet port is connected to a high pressure fluid source on the primary side and the outlet port is connected to a low pressure range on the secondary side. It will be noted that the valve port 114 is formed to define a valve seat for the main valve member 118 which is resiliently pressed by a coil spring against a valve seat portion provided on the inlet side of the valve port 114.

An operating part comprising a piston 120 is slidably disposed within a cylinder 122 with an operating rod being formed by a piston rod 1 of the piston. The operating or piston rod 1 is in contact with a valve spindle 115 which is formed on the man valve member 118.

The piston 120 has a peripheral wall which is formed with grooves within which piston rings 12 and 13 are fitted. A lower end wall 2 of the piston 120 has an orifice extending therethrough.

A pilot valve 126 is disposed in a primary pressure passage 124 for connecting the inlet port 112 with a space above the piston 120, which space constitutes a piston chamber. A diaphragm 128 is installed with its outer periphery held between flanges 130 and 132. A space below the diaphragm 128 is connected in flow communication with the outlet port 116 through a secondary pressure pasage 134.

The tip of a valve spindle 136 of the pilot valve 126 is in contact with the center of the lower surface of the diaphragm 128. A coil spring 140 for establishing a pressure setting in the valve assembly is in contact with the upper surface of the diaphragm 128 through a spring seat 138. An adjusting screw 144 is installed and engaged with screw threads in the valve casing 110. When the adjusting screw 144 is rotated clockwise or counterclockwise, the force of the pressure setting spring 140 which urges the diaphragm 128 downwardly will vary. Utilizing the spring force of the pressure setting spring 140 as a reference value, the diaphragm 128 will deflect according to the secondary pressure acting on its lower surface to displace the valve spindle 136, thus opening and closing the pilot valve 126. Consequently, the fluid pressure on the primary side flows into the piston chamber to drive the piston 120 and displace the main valve member 118, thereby allowing fluid to flow from the inlet port 112 to the outlet port 116 through the valve port 114. The valve port 114 will automatically open as fluid pressure on the secondary side decreases and it will close as the fluid pressure increases.

Below the valve port 114, there is installed a wall member 146 which forms an annular space 148 between itself and an inner wall of a portion of the valve casing 110. The upper part of this annular space 148 is in communication with the inlet port 112 through a conical screen 150 and its lower part communicates with the upper part of a drain valve chamber 152. The upper part of the drain valve chamber 152 communicates with the valve port 114 through a central opening defined by the wall member 146. In the annular space 148, there is disposed a swirl vein 154 consisting of an inclined wall.

Thus, as fluid from the inlet port 112 flows through the valve port 114, it is deflected into a swirling flow pattern by the swirl vein 154 when it passes through the annular space 148. The fluid is therefore thrown or impelled outwardly and impinges against the inner wall of the surrounding valve casing flowing downwardly through the inside of the drain valve chamber 152. At the same time, a light gas or vapor swirls at the central part and flows to the valve port 114 through the central opening of the wall member 146 flowing therethrough out to the outlet port 116.

In the bottom of the drain valve chamber 152, there is formed a drain valve port 158 communicating with a drain port 156. A spherical valve float 160 is movably housed in a float cover 164 which is provided with air vents 162 in the upper part thereof.

As the valve float 160 floats upwardly and downwardly depending upon the water level in the drain valve chamber 152, the drain valve port 158 is automatically opened and closed to discharge water which accumulates in the drain valve chamber 152.

The flow rate characteristics of the reducing valve assembly depicted in FIG. 9 involve a relatively large offset and a relatively small rated flow rate which are not significantly different from those of prior art reducing valves. The limit of the flow rate characteristics is presumed to be due to the construction such that, when the piston 120 executes a downward stroke to push on and open the main valve member, the valve member, receiving the fluid jetting out through the valve port, will be pushed upwardly and at the same time vibrated.

Accordingly, in order to improve flow rate characteristics, it is necessary to improve the structure of a connecting section which joins the piston, or the operating section, with the valve member.

The present invention is directed toward improving the structure and operating characteristics of the valve assembly shown in FIG. 9 by a novel and improved configuration for the operating part or piston member 120. In accordance with the present invention, the movable wall of the operating section or piston 120 is formed so as to connect it with the operating rod or piston rod 1 which transmits displacement of this movable wall by a wall configured to have a generally hemispherical configuration expanding outwardly in the radial direction of the operating or piston rod 1.

Several embodiments of the present invention will be described hereinafter by reference to FIGS. 1-8, but it will be seen that, in general, each embodiment comprises a spherically-shaped or curved portion and, in some cases, the embodiments involve a plurality of curved surfaces as will be described hereinafter.

Figure 1:
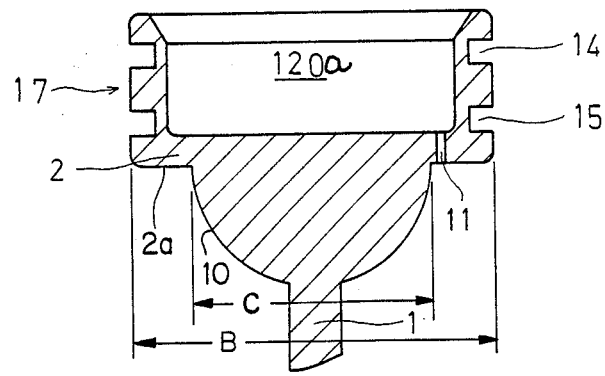
FIG. 1 is a sectional view of a piston member for a reducing valve in accordance with the present invention.

Referring first to FIG. 1, there is shown a first embodiment of the invention comprising a piston 120a which is formed essentially like the piston 120 shown in FIG. 9, except that a hemispherical surface 10 is provided to extend between the lower end wall 2 and the piston or operating rod 1. Thus, as shown in FIG. 1, the piston 120a is formed as comprising the movable wall of the operating section and the operating rod of the reducing valve shown in FIG. 9. Similar reference numerals are used for corresponding members. The piston 120a has piston rings 12 and 13 fitted in grooves 14 and 15 formed in the outer peripheral wall 17 of the upper cylindrical section and may be inserted in the cylinder 122. The outer peripheral wall 17 has an outside diameter which is the maximum diameter for the piston 120a. The bottom wall 2 is formed with a flat lower surface and is provided with the orifice 11. The piston rod 1 is formed as a circular cylinder, the lower end of which is in contact with the upper end of the valve spindle 115 of the main valve member 118.

The lower surface of the bottom wall of the piston 120 which constitutes the movable wall of the operating section and the piston rod 1 which constitutes the operating rod are connected by the hemispherical surface 10. The hemispherical surface 10 is connected to the lower surface of the bottom end wall and the piston 1 and extends with a radius which is relatively extremely small or through an unmachined radial surface. This leaves a flat annular section 2a of bottom wall 2 around surface 10. The dimensions of representative parts are, for example, as follows: the outside diameter of the piston 120a is 47 mm; the outside diameter of the piston rod 1 is 7 mm; the inside diameter of the valve port 114 is 20 mm; width is 16 mm; a distance from the lower surface of the bottom wall 2 to the valve face of the valve member 118 with the piston rod 1 in contact with the valve spindle 115 is 50 mm; and the radius of the connecting spherical surface 10 is 14 mm.

As shown in FIG. 1, the piston 120a is connected to piston rod 1 in cantilever fashion. That is, no support is provided for the piston other than on the outer peripheral wall 17 of the upper cylindrical section of the piston which rides in the cylinder 122 (see FIG. 9). The advantages of the invention are best realized when the ratio between the outer diameter B of the upper cylindrical section 17 of piston 120a to the diameter C of the hemispherical surface 10 (C/B) is in the range between 0.4 to 0.7. Observance of this ratio and the use of the flat annular section 2a under the outer cylindrical section of the piston are also observed in the embodiments of FIGS. 2-8 to achieve the advantages of the present invention.

Further embodiments of the invention will now be dscribed with reference to FIGS. 2-8, but it will be seen that many of the parts of the member which will be described therein are essentially identical with that of the embodiment of FIG. 1, for example, with regard to the formation of the grooves 14 and 15 and the shape of the operating rod 1.

Figure 2:
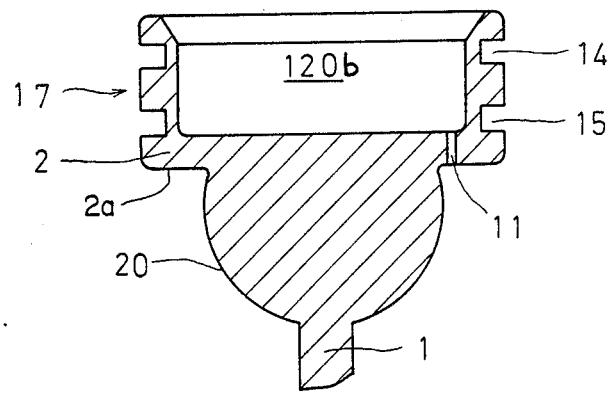
FIGS. 2 and 3 are both sectional views, respectively, of a second and third embodiment of the invention.

Thus, with reference to FIG. 2, there is shown a second embodiment of the invention wherein a surface 20 is provided extending between the end wall 2 and the operating rod 1. The surface 20 constitutes three-quarters of a sphere and extends between the wall 2 and the rod 1. Thus, the embodiment of FIG. 2 is concerned with the formation by a three-fourths spherical surface of a connecting surface between the movable wall and the operating rod. FIG. 2, as FIG. 9, shows a piston 120b constituting the movable wall of the operating speed in the operating rod of the reducing valve.

The piston rod 1 may be formed as a circular cylinder and the spherical surface 20 and the lower surface of the bottom wall 2 are connected through a radius surface, thereby allowing smooth diversion of fluid. The spherical surfac 20 and the piston rod 1 are connected through a radial surface having an extremely small radius or through an unmachined radial surface.

Figure 3:
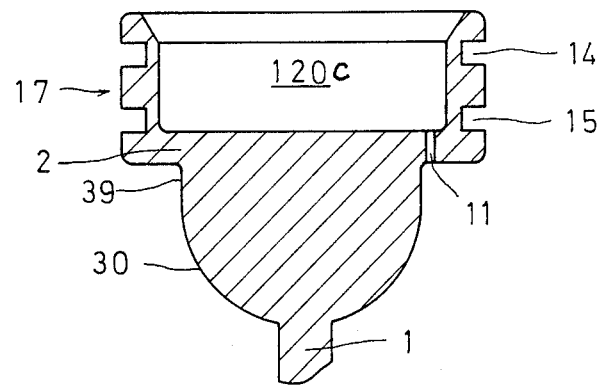

A third embodiment of the invention is shown in FIG. 3 constituting a piston 120c. In this embodiment, a hemispherical surface 30 is provided with a continuing or contiguous cylindrical surface 39 extending between the hemispherical surface 30 and the bottom wall of the wall member 2. The hemispherical surface 30 is contiguous with the piston rod 1 and the cylindrical surface 39 is connected to the lower surface of the bottom wall 2, and the hemispherical surface 30 is connected to the piston rod 1, through a radius surface having an extremely small radius or through an unmachined radius surface.

Figure 4:
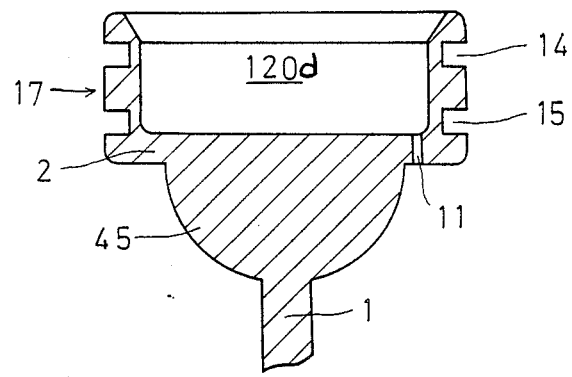
FIGS. 4, 5 and 6 are, respectively, a sectional view, a bottom view and a side view of a third embodiment of the invention with FIG. 6 being a view of the piston of FIG. 5 as viewed in the direction of arrows III—III shown in FIG. 5.
Figure 5:
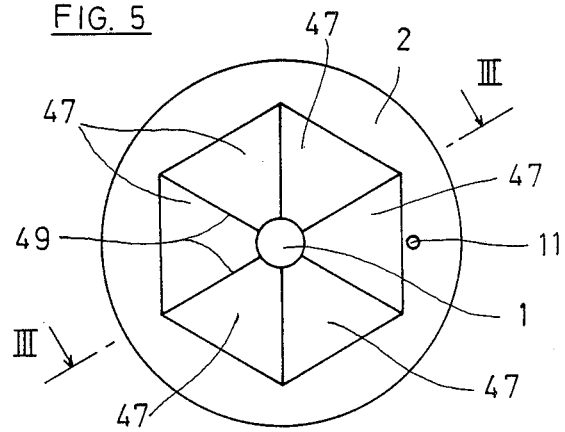
Figure 6:
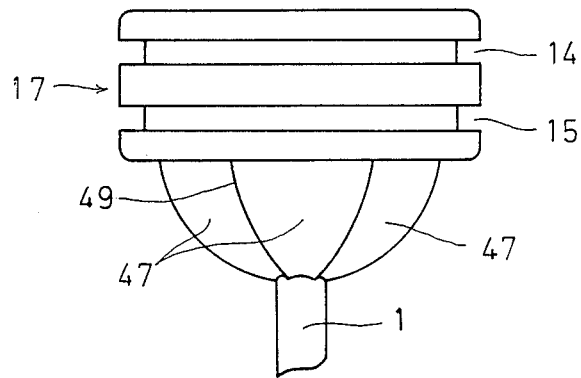

A fourth embodiment of the invention is shown in FIGS. 4, 5 and 6. This fourth embodiment comprises a piston member 120d comprising a curved surface wall 45 which is constituted as a fluted hemispherical configuration consisting of six contiguous panels 45. Thus, in the embodiment of FIGS. 4-6, there are provided six curved surfaces of a connecting curved wall between the movable wall and the operating rod. As shown in FIGS. 4-6, the piston 120d constitutes the movable wall of operating section and the operating rod of the reducing valve as shown in FIG. 9. The piston rod 1 is commonly formed as a circular cylinder, but it may be an angular column, such as a hexagonal column. The curved surface wall 45 extends between the bottom wall 2 and the piston rod 1 and the connecting curved surface 45 consists of the six curved surfaces 47 which expand outwardly in the diametral direction of the piston rod 1 and are separated by ridges or flutes 49 formed at their jointed sections. The curved surfaces 47 are all of identical shape and are arranged around the piston rod I, each to surfaces facing each other.

Figure 7:
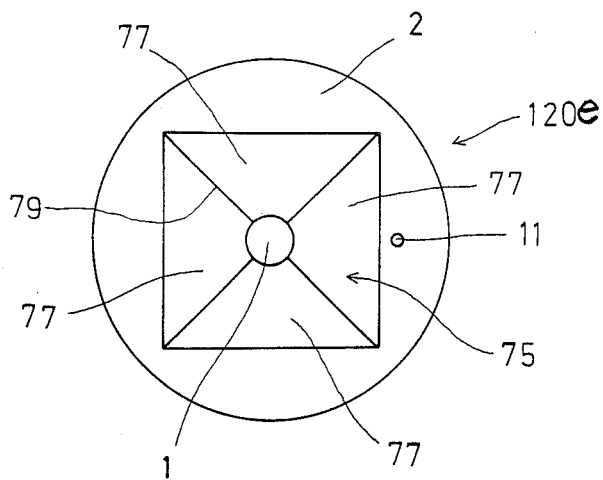
FIGS. 7 and 8 are bottom views showing, respectively, a fifth and a sixth embodiment of the invention.

A fifth embodiment of the invention is depicted in FIG. 7. This embodiment is concerned with the formation of four curved surfaces of the connecting curved surface wall between the movable wall and the operating rod. FIG. 7 is a bottom view of a piston 120e which is essentially similar to the pistons shown in FIGS. 1-6, with the exception of the formation of the wall extending between the bottom wall member 2 and the piston rod 1. The piston rod 1 is commonly a circular column, but it may be an angular column, such as a square column.

The lower surface of the bottom wall 2 of the piston 120e which constitues the movable wall of the operating section and the piston rod 1 which constitutes the operating rod are connected by a connecting curved surface wall 75. The connecting curved surface wall 75 comprises a fluted hemispherical configuration consitingf of six contiguous panels 77. The contiguous panels 77 are curved surfaces expanding outwardly in the diametral direction of the piston rod 1 and separated by ridges 79 which are formed at their jointed sections. The curved surfaces 77 are all of identical shape and arranged around the piston rod 1, each to surfaces facing each other.

Figure 8:
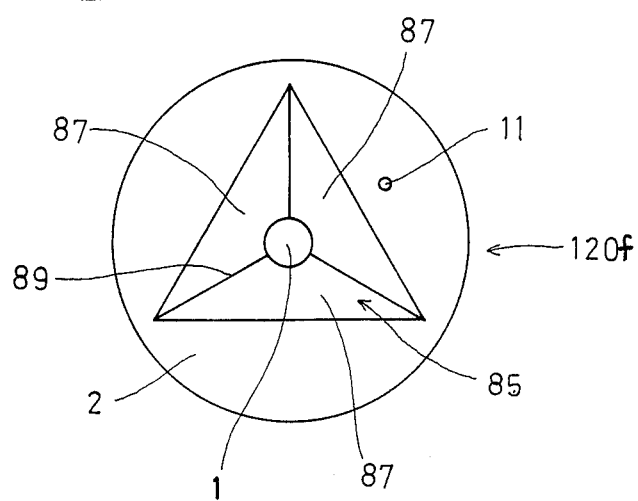

A sixth embodiment of the invention is depicted in FIG. 8. This embodiment is concerned with the formation of three curved surfaces, of the connecting curved surface wall between the movable wall and the operating rod. In FIG. 8, there is shown a piston 120f with a piston rod 1 corresponding to the operating rod. THe piston rod 1 is commonly a circular column, but it may be an angular column, such as a triangular column. The lower surface of the bottom wall 2 of the piston 120f which constitutes the movable wall of the operating section and the piston rod 1 which constitutes the operating rod are connected by a connecting curved surface wall 85 which comprises a fluted hemispherical configuration consisting of three contiguous panels 87. The three curved surfaces 87 expand outwardly in the diametral direction of the piston rod 1 and ridges 89 are formed at their jointed sections. The curved suraces 87 are all of identical configuration and arranged around the piston rod 1, each to surfaces facing each other.

Thus, it will be seen that the technological advancement of the present invention disclosed herein for the solution of the problems arising with regard to the prior art discussed above comprises connecting the movable wall of the operating section to the operating rod which transmits the displacement of the movable wall by a wall having a spherical or hemispherical configuration expanding outwardly in the radial direction of the operating rod or by providing a plurality of curves, such as curved surfaces.

The movable wall is a diaphragm itself in the direct-acting reducing valve and a lower end wall of the piston in a pilot-operated reducing valve.

The most desirable shape of a connecting section between the movable wall and the operating rod is hemispherical. However, a spherical surface slightly larger than a hemisphere, such as that shown in FIG. 2, or a spherical surface slightly less than a hemisphere, or a spherical surface having a continuing cylindrical part, such as shown in FIG. 3, may be used.

A curved surface expanding outwardly with a conical configuration, such as a curved surface having an elliptical section, can obtain the functional effect described herein. Therefore, the nearly hemispherical surface includes these curved surfaces.

Each curved surface consisting of the wall surface connecting the movable wall to the operating rod may be a curved surface formed by bending a flat surface into a bow shape in one direction, or a spherical surace, or an elliptical curved surface. At a joint between the curved surfaces constituting a wall surface is formed a ridge which may be left as it is or rounded by machining into a radius surface.

The function of the technological improvement of the invention involves several considerations. The fluid jetting out of the valve port flows straight toward the movable wall of the operating section. On its way, the fluid impinges again against the connecting curved surface, then flowing downwardly along its surface.

In the lower part of the connecting curved surface, the fluid speed increases and the static pressure is low. In the meantime, the fluid speed is slow, while the static pressure is high in the upper part. Therefore, the movable wall and the operating rod are pulled downwardly, namely, toward the valve port side. In other words, a push of the fluid jetting out of the valve port is not directly received by the wall surface, but is lightly received by a portion by the formation of the aforementioned static pressure difference, and, thus, the valve member is displaced toward the valve port by that amount, thereby separating the valve member from the valve seat and increasing a wider opening of the valve port.

The connecting curved surface is self-positioned at center in relation to the fluid jetting out of the valve port. Namely, when the connecting curved surface is on the central axis of the jet stream, the fluid is flowing at the same velocity all around the periphery. However, if the stream is deflected sidewardly, the flow velocity on the periphery will become nonuniform, and, thus, the static pressure will be distributed to push the connecting curved surface back on the central axis. Consequently, the movable wall of the operating section and the operating rod can smoothly move along the central axis of the jet without vibration or inclination and, further, with little variation in the secondary pressure and little offset.

By utilization of the present invention, special advantages are derived. Since the movable wall of the operating section and the operating rod are smoothly and largely displaced toward the valve port side, a small offset and a large rated flow rate results. Since the movable wall of the operating section and the operating rod are only slightly subject to vibration and inclining force, the pressure on the secondary side varies very little. Furthermore, sliding sections of the piston and cylinder and the valve member and the valve seat are not subjected to excessive wear, thereby affording a good extended period of initial operation.

While specific embodiments of the invention have been shown and described in detail to illustrate the application of the inventive pricinples, it will be understood that the invention may be embodied otherwise without departing from such principles.

What is claimed is:

1. In a reducing valve assembly, including a fluid inlet port (112) and a fluid outlet port (116), with a main valve for controlling flow therethrough, wherein said main valve includes a valve member (118) movable with respect to a main valve seat (114) and actuated by an operating part comprising a piston (120) having a piston rod (1) extending toward the main valve seat and engageable with the main valve member for moving the main valve member away from the main valve seat, the improvement comprising the piston (120a) being connected in cantilever fashion to only an end of the piston rod, said piston being slidably mounted in a cylinder of the valve assembly to act as the sole guiding mechanism for movement of the piston rod, a movable wall having an approximately circular section through the center of said piston and being spaced from said valve seat, said movable wall extending outwardly in a diametrical direction from said piston rod to said piston, said piston having an outer peripheral wall connected directly to said movable wall, said outer peripheral wall carrying the outer maximum diameter of said piston, said movable wall having a flat annular section (2a) directed around said approximately circular section under said piston, with the ratio between the maximum diameter of said approximately circular section to the maximum diameter of the piston being in the range of from about 0.4 to 0.7.

2. An assembly according to claim 1, wherein said movable wall comprises a hemisphere.

3. An assembly according to claim 1, wherein said movable wall comprises three-quarters of a hemisphere.

4. An assembly according to claim 1, wherein said movable wall comprises a hemisphere with a contiguous cylindrical portion.

5. An assembly according to claim 1, wherein said movable wall has a fluted hemispherical configuration consisting of six contiguous panels.

6. An assembly according to claim 1, wherein said movable wall has a fluted hemispherical configuration consisting of four contiguous panels.

* * * * *